May 22, 1962
G. B. FLIEZAR ET AL
3,036,186
H.F. STATION FOR WAVE TUBE EXHAUST MACHINE
Filed Nov. 18, 1959
3 Sheets-Sheet 1
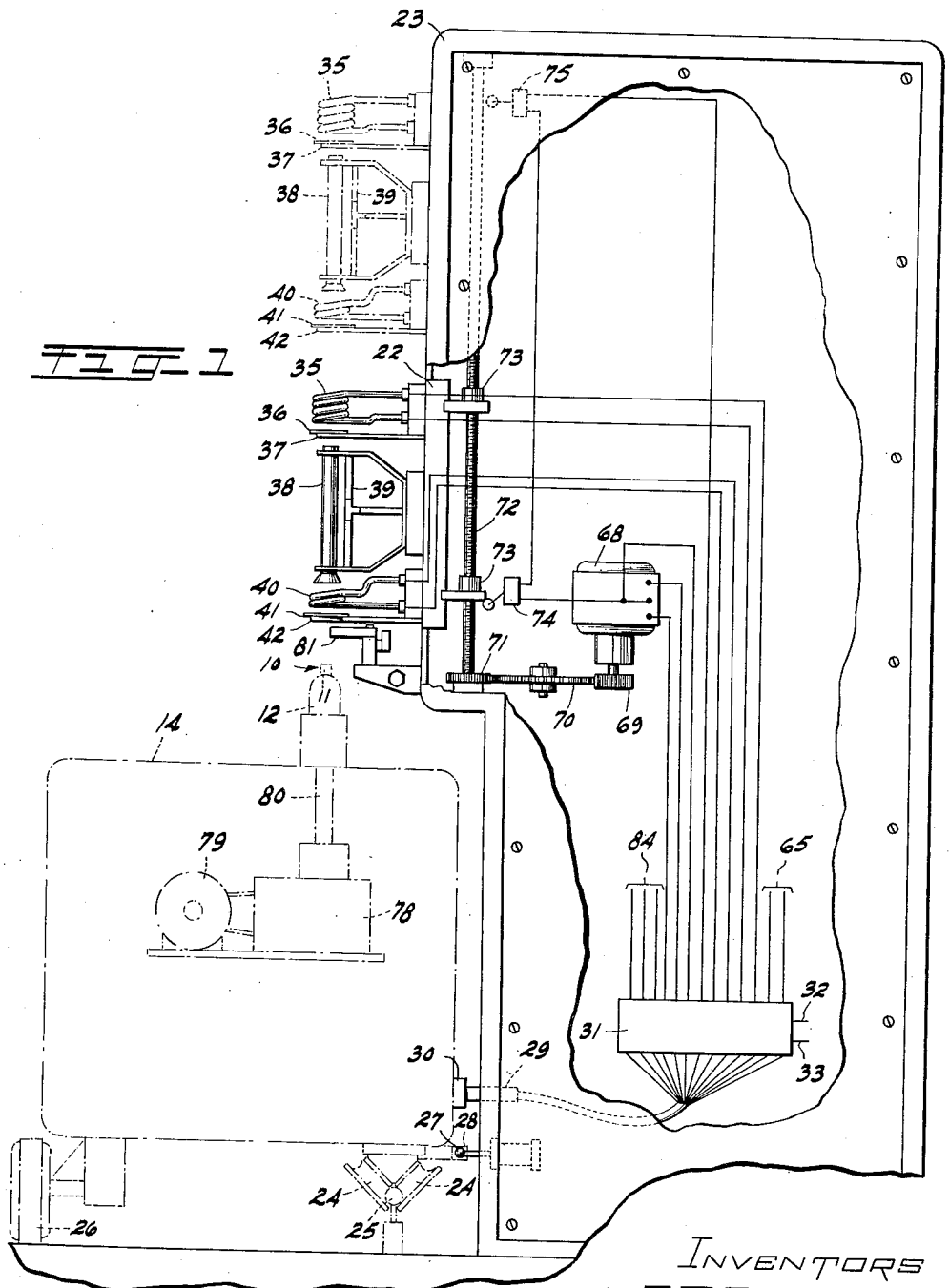
INVENTORS
G.B.FLIEZAR
J.J.MONAHAN
By
ATTORNEY

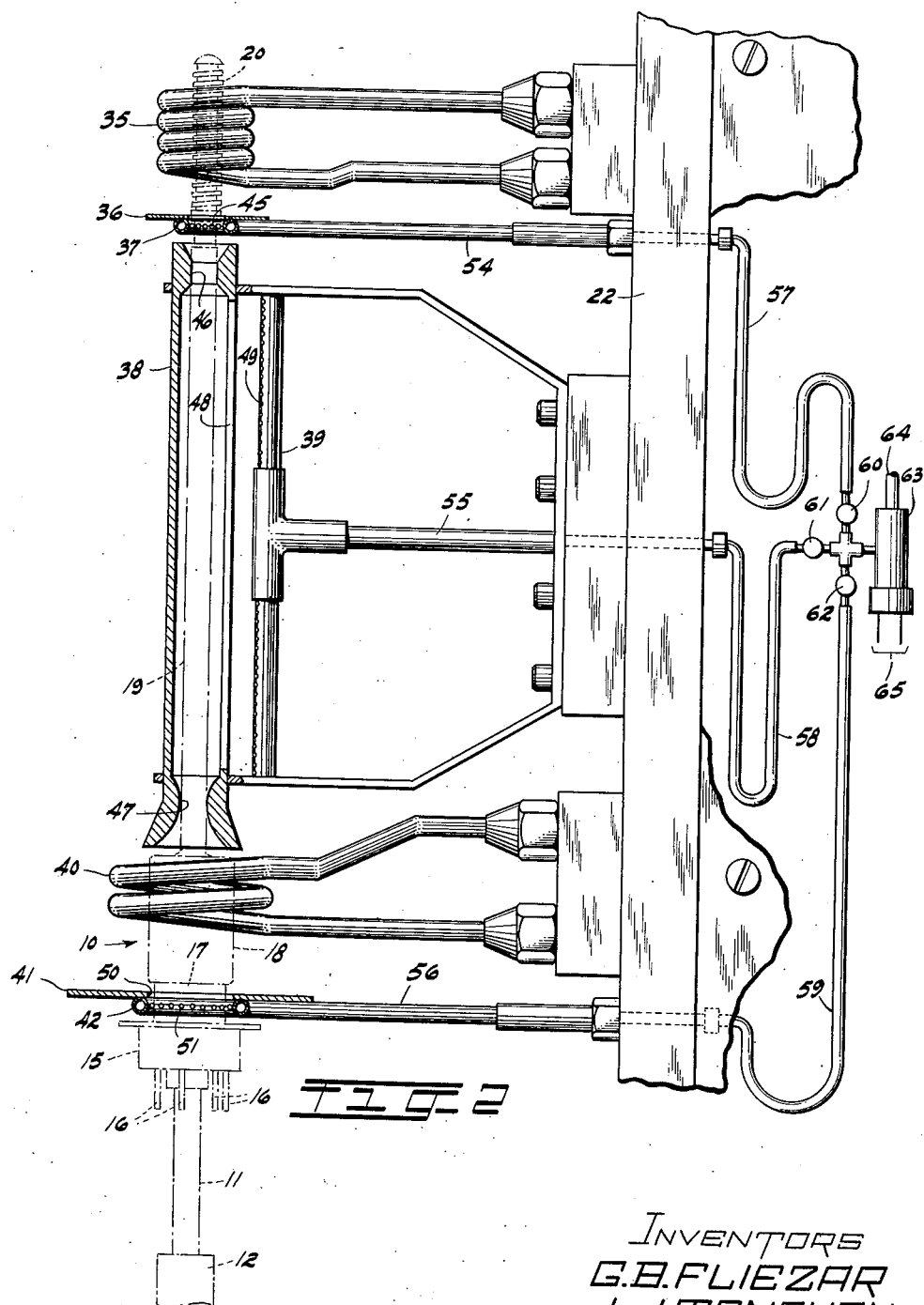

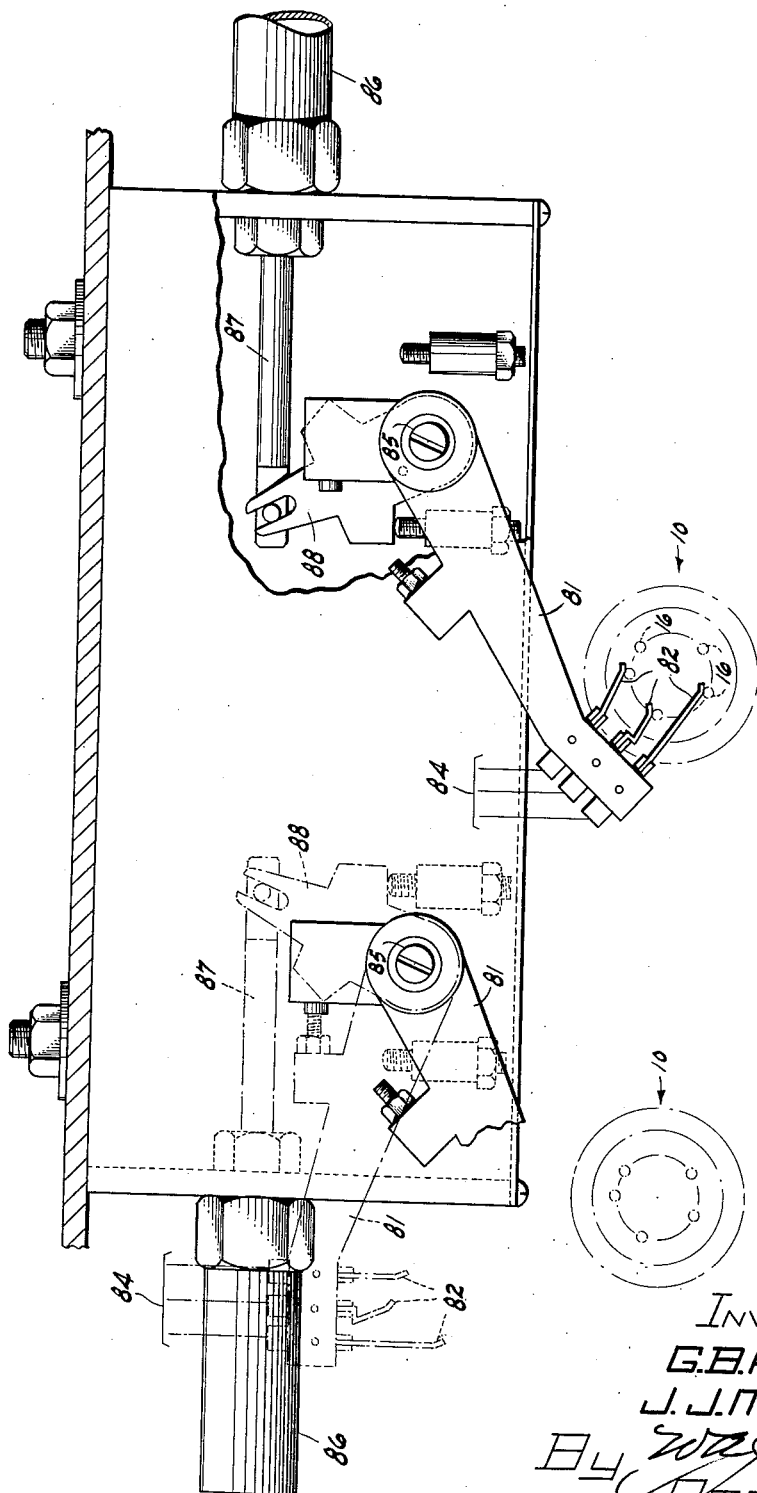

United States Patent Office 3,036,186
Patented May 22, 1962

3,036,186
H.F. STATION FOR WAVE TUBE EXHAUST MACHINE
Geza B. Fliezar and Jack J. Monahan, Allentown, Pa., assignors to Western Electric Company, Incorporated, New York, N.Y., a corporation of New York
Filed Nov. 18, 1959, Ser. No. 853,966
6 Claims. (Cl. 219—10.69)

This invention relates to apparatus for treating portions of articles, particularly traveling wave tubes.

Traveling wave tubes are elongated hollow articles which, after assembly, must be evacuated as thoroughly as possible prior to the sealing and pinching off of the metallic tubulation thereof. To bring about satisfactory evacuation of each article or tube, certain actions must take place such as out-gassing getters, the anode and collector and also out-gassing the helix. Certain of these functions are performed by heating means such as high frequency coils or by passing electrical current through certain of the other elements. During these operations, certain other portions of the article must be protected from the heat created in bringing about these results.

An object of the present invention is an apparatus which is highly efficient in treating portions of articles.

In accordance with the object, the invention comprises means to apply heat to a portion of an article located in a treating position, a shield to be located between the treated portion and an adjacent portion, and means to move the treating means and shield relative to the article prior to, and subsequent to, the treating operation.

More specifically, while spaced portions of an article such as a traveling wave tube or other elongate hollow articles are treated by high frequency coils, other intermediate portions of the article are shielded and protected from the heat created by the high frequency coils. In addition to the shields, means such as nozzles connected to a supply of coolant are positioned to direct the coolant, under pressure, to other portions. The shields serve to protect portions being heated from the coolant and portions being cooled from the heat. However, when treating the helix of a traveling wave tube, the helix is heated to a high temperature by electric current and it is not possible to place a shield between it and the surrounding glass tube. In this case, cracking of the glass is prevented by an external shield which defines a passage for coolant along the external surface of the glass.

Other objects and advantages will be apparent from the following detailed description when considered in conjunction with the accompanying drawings wherein:

FIG. 1 is a side elevational view of the apparatus; this view also illustrating schematically the electrical controls;

FIG. 2 is an enlarged vertical sectional view of a portion of the apparatus illustrating the cooling and heat treating means; and FIG. 3 is an enlarged horizontal sectional view of the contact actuating means.

In the present instance, articles 10 have their tubulations 11 mounted in a holder 12 of a dolly 14. In the present instance, two articles 10, spaced as illustrated in FIG. 3, are to be treated simultaneously. However, these articles are disposed in alignment and only one is seen in FIG. 1 and FIG. 2. With reference to FIG. 2, the article or traveling wave tube 10 is supported by the location of its tubulation in the holder 12 to locate the other portions of the article such as its base 15, with its terminals 16 projecting downwardly therefrom, a portion 17 immediately above the base, a portion 18 which houses the anode, the collector, and one or more getters, a glass tube portion 19 defined as the helix, and an uper portion 20.

A carriage 22 is positioned in the front of a housing 23 adjacent the path of dollies 14 which are moved into the treating position by rollers 24 thereof riding on a track 25 and a pneumatic tired wheel 26 riding on the floor. A plunger 27 of an air cylinder mounted in the housing 23 is positioned to engage a recessed projection 28 of each dolly, to locate it with the articles thereon in treating position. The locating means, as well as means for moving a contact element 29 mounted in the housing 23 into engagement with a contact member 30 of each dolly moved into the treating position, are disclosed in applicants' co-pending applications, Serial No. 853,968, filed November 18, 1959. The contact element 29 has a series of contacts, not shown, which are parts of electrical circuits held incomplete until the contact element 29 is moved into engagement with the contact member 30. These circuits are under the control of a unit 31 supplied with electrical energy through lines 32 and 33 and controlling the operations of the various features of the apparatus.

The carriage 22 supports an upper high frequency coil 35, an upper shield 36, an upper circular nozzle 37, a tubular shield 38, a vertical nozzle 39, a lower high frequency coil 40, a lower shield 41, and a lower circular nozzle 42. These various elements 35 to 42, inclusive, are constructed to surround the various portions of the article which they are to treat either by heating means, cooling means or shielding means.

By viewing FIG. 2, it will be observed that the high frequency coil 35 surrounds a predetermined length of the portion 20. The shield 36, when in the treating position, will shield the heating effect of the high frequency coil 35 from the portion 19 of the tube or article and shield the portion 20 from coolant from the nozzle 37. The shield 36 is supported by, and fixed to, the circular nozzle 37 which has a series of outlets 45 around its inner periphery to allow the escapement of a coolant such as air under pressure from the nozzle to surround the adjacent area of the article. The shield 38 is tubular with members 46 and 47 substantially closing the shield about the upper and lower parts of the glass or helix portion 19 leaving a cylindrical space between the shield and the major portion of the helix for the circulation of a coolant such as air under pressure. This coolant is forced through an elongate aperture 48 in the shield 38 from a vertical row of apertures or outlets 49 in the nozzle 39.

The high frequency coil 40 is sufficiently large to surround the portion 18 and is mounted on the carriage 22 to be located at a given position with respect to the portion 18. The lower shield 41 has an aperture 50 so that it may be moved downwardly over the preceding portions of the article and extend outwardly a distance sufficient to shield the base 15 and adjacent portion 17 from the heat created by the high frequency coil 40. The lower shield also protects the heated portion 18 from a coolant from the nozzle 42. The lower nozzle 42 is similar in structure to the upper nozzle 37 but is larger so that it may be moved downwardly over the article to the position shown in FIG. 2. A circular arrangement of apertures or outlets 51 serve to direct jets of coolant about the portions 15 and 17. The high frequency coils 35 and 40 are suitably mounted on the carriage 22 and are connected electrically to circuits under the control of the unit 31, as illustrated in FIG. 1. The nozzles 37, 39, and 42 are supported directly by rigid fluid lines 54, 55, and 56 fixedly mounted in the carriage and connected to flexible fluid lines 57, 58, and 59. These fluid lines are connected through pressure control valves 60, 61, and 62 to a solenoid valve 63 and through this valve to a supply line 64 for a coolant such as air under pressure. Conductors 65, illustrated both in FIGS. 1 and 2, are parts of a circuit under the control of the unit 31.

The carriage 22 is positioned normally in its upper or dotted position, FIG. 1, is moved downwardly to the treating position shown in solid lines in FIGS. 1 and 2, and returned to the dotted position after the treating operation. The moving means for the carriage, in the present instance, is illustrated as a reversible motor 68 driving a pinion 69, one or more intermediate gears 70 to drive gears 71 mounted on the lower ends of threaded shafts 72, only one of which is shown. The threaded shafts are mounted at spaced positions and through the aid of pairs of members 73, one or more of which may be threaded, the carriage 22 is supported by the shafts and moved through their like rotations in one direction to move the carriage downwardly and in a reverse direction to move the carriage upwardly. The schematic illustration, in the present instance, includes limit switches 74 and 75, respectively, de-energizing the motor 68 at the ends of the lowering and raising movements of the carriage 22.

During the treating operation, a vacuum pump 78, driven by a motor 79 and connected at 80 through the support 12 to the tubulations 11 of the articles, serves to evacuate the article while being assisted by the treating means.

A contact supporting element 81, shown in FIG. 1 as located beneath the lower nozzle 42, is shown in detail in FIG. 3. Actually there are two elements 81 supporting contacts 82 positioned to engage certain of the terminals 16 of the article to bring about an internal treating means of the article, particularly the helix portion 19. The contacts 82 are connected electrically to conductors 84, shown in FIGS. 1 and 3, to position the contacts under the control of the unit 31. Each element 81 is mounted on a spindle 85 and under the control of an air cylinder 86. The air cylinders 86 by suitable means, not shown, are also under the control of the unit 31 to move their piston rods 87 outwardly to rock their levers 88 to rock the spindles 85, upon which they are mounted, to move the elements 81 and thereby move the contacts 82 into and out of engagement with the terminals 16.

Operation

When each dolly 14 is moved into the treating position, locked in place by the plunger 27 and connected electrically to the treating means by the interengagement of the contact element 29 with the contact member 30, the unit 31 functions in a given order to energize the motor 68 to drive the connecting mechanism to move the carriage 22 downwardly, to bring the groups of treating units about each article.

When the carriage 22 is lowered, the other circuits are closed in a predetermined order to energize the solenoid valve 63 to cause the coolant to pass through the various lines under pressures controlled by the valves 60, 61, and 62, and to apply the coolant to the portions prior to heat created by the high frequency coils 35 and 40 or through the application of the electrical energy applied through the contacts 82 and terminals 16.

The shields 36, 38, and 41 serve not only to deflect heat of adjacent heating means from the portions they are to protect, but serve also in controlling the direction of flow of the coolant from their respective nozzles. The shields 36 and 41 keep the coolant from the portions which are to be heated or which are heated as a result of the heating means of high frequency coils but direct the coolant, in each instance, to the parts which are to be protected from the heat. Furthermore, the shield 38 receives the vertical stream of coolant and directs it about and provides a cylindrical enclosure for the coolant about the portion 19. When the treating period has terminated, the heating means including the high frequency coils and the circuits through the contacts 82 and terminals 16 are de-energized. The cooling means may continue or terminate shortly thereafter through de-energization of the solenoid valve 63. The cylinders 86 are operated to move the elements 81 to their out positions. At this time, the motor 68 is energized but in a reverse order to drive the carriage through rotation of the shafts 72 to its upper position.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for treating portions of hollow elongated articles comprising means to locate an elongated article in a treating position, a carriage, means to support the carriage for movement in a path relative to the treating position and parallel with the article in the treating position, means to electrically heat one of the portions internally, a hollow shield supported by the carriage and movable therewith relative to the article to surround said portion leaving a space between said portion and the shield, and means to force a coolant into the shield to fill the space in the shield with a coolant to surround said portion therewith.

2. An apparatus for treating portions of hollow elongated articles according to claim 1 in which an aperture is disposed in a side wall of the hollow shield between ends thereof, and the means to fill the space in the shield with a coolant includes a nozzle supported by the carriage and directed toward the aperture.

3. An apparatus for treating portions of hollow elongated articles according to claim 2 in which apertured members mounted at the ends of the hollow shield are supported by and moved with the carriage concentric with the article to close the ends of the space in the shield to retain the coolant therein.

4. An apparatus for treating portions of hollow elongated articles comprising transporting means to move successive articles into a treating position, means to secure the transporting means and the article against movement in the treating position, a carriage, means to support the carriage for movement into and out of treating position in a path parallel with the article held stationary therein, treating units mounted on the carriage at spaced positions and in alignment with each other to move with the carriage into the treating position to surround their respective portions of the article, a circuit controlling unit rendered effective subsequent to the securing of the transporting means in the treating position to render the treating units effective, a contact element having contacts positioned thereon for engagement with terminals of the articles, means to support the contact element for movement into and out of registration with the terminals, and a circuit of the circuit controlling unit completed through engagement of the contacts with the terminals of the article.

5. An apparatus for treating portions of hollow elongated articles according to claim 4 in which fluid operable units operatively connected to the contact element causes movement of the element to move the contacts into and out of engagement with the terminals.

6. An apparatus for treating portions of hollow elongated articles comprising transporting means to move successive articles into a treating position, means to secure the transporting means and the article against movement in the treating position, a carriage, means to support the carriage for movement into and out of treating position in a path parallel with the article held stationary therein, treating units mounted on the carriage at spaced positions and in alignment with each other to move with the carriage into the treating position to surround their respective portions of the article, a circuit controlling unit rendered effective subsequent to the securing of the transporting means in the treating position to render the treating units effective, a contact element having contacts positioned thereon for engagement with terminals of the articles, means to support the contact element for movement into and out of registration with the terminals, a circuit of the circuit controlling unit completed through engagement of the contacts with the terminals of the article, certain of the treating units being energized electrically under control of the circuit controlling unit to heat their respective portions, certain other treating units being nozzles responsive to the circuit controlling unit to apply a coolant under pressure to certain other portions, and members located with respect to their nozzles to control the coolant therefrom to direct the coolant toward portions to be cooled thereby and shield the heated portions therefrom.

References Cited in the file of this patent
UNITED STATES PATENTS

| | | |
|---|---|---|
| 2,202,759 | Denneen et al. | May 28, 1940 |
| 2,355,184 | Somes | Aug. 8, 1944 |
| 2,426,053 | Roberds | Aug. 19, 1947 |
| 2,445,822 | Briechle | July 27, 1948 |
| 2,449,089 | Somes | Sept. 14, 1948 |
| 2,517,607 | Strickland | Aug. 8, 1950 |
| 2,632,841 | Wharff | Mar. 24, 1953 |
| 2,643,325 | Body et al. | June 23, 1953 |
| 2,870,309 | Capita | Jan. 20, 1959 |